United States Patent
Eppehimer et al.

(10) Patent No.: US 12,193,608 B2
(45) Date of Patent: *Jan. 14, 2025

(54) COMBINED STIRRING, MIXING AND BLENDING APPARATUS FOR COMMERCIAL KITCHENS

(71) Applicant: Ayr-King Corporation, Louisville, KY (US)

(72) Inventors: William Samuel Eppehimer, Louisville, KY (US); Michael Paul DeLain, Louisville, KY (US)

(73) Assignee: Ayrking Corporation, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,829

(22) Filed: Oct. 11, 2023

(65) Prior Publication Data

US 2024/0049918 A1 Feb. 15, 2024

Related U.S. Application Data

(63) Continuation of application No. 17/068,208, filed on Oct. 12, 2020, now Pat. No. 11,793,357.

(60) Provisional application No. 62/915,891, filed on Oct. 16, 2019.

(51) Int. Cl.
*A47J 43/00* (2006.01)
*A47J 43/046* (2006.01)
*A47J 43/07* (2006.01)

(52) U.S. Cl.
CPC ......... *A47J 43/046* (2013.01); *A47J 43/0727* (2013.01)

(58) Field of Classification Search
None
See application file for complete search history.

(56) References Cited

U.S. PATENT DOCUMENTS

| | | | |
|---|---|---|---|
| 6,251,040 B1 * | 6/2001 | Safont | A47J 43/0716 475/299 |
| 2014/0117130 A1 * | 5/2014 | Conti | B01F 27/071 241/282.2 |

* cited by examiner

*Primary Examiner* — Anshu Bhatia
(74) *Attorney, Agent, or Firm* — Maginot, Moore & Beck, LLP

(57) ABSTRACT

A stirring, mixing and blending (SMB) apparatus includes a mixing container mountable on a base which houses the components and controllers for rotating a blade assembly within the container. The blade assembly includes a pair of substantially flat wings mounted on the opposite sides of a horizontal rod. The wings are generally rectangular with rounded corners and blunt edges. The wings are oriented at a downward angle relative to the horizontal rod calibrated to enhance the stirring, mixing and blending functions of the apparatus at low rotational speeds.

12 Claims, 4 Drawing Sheets

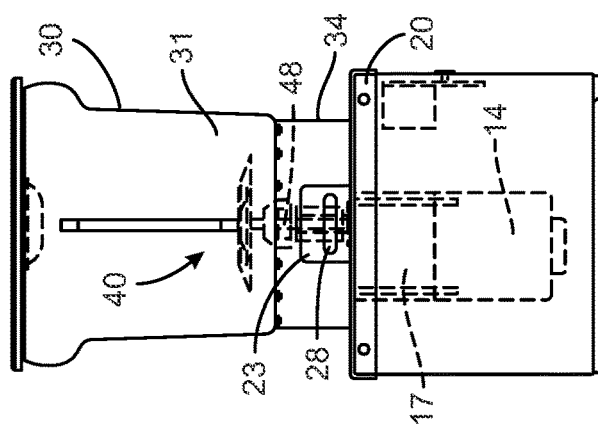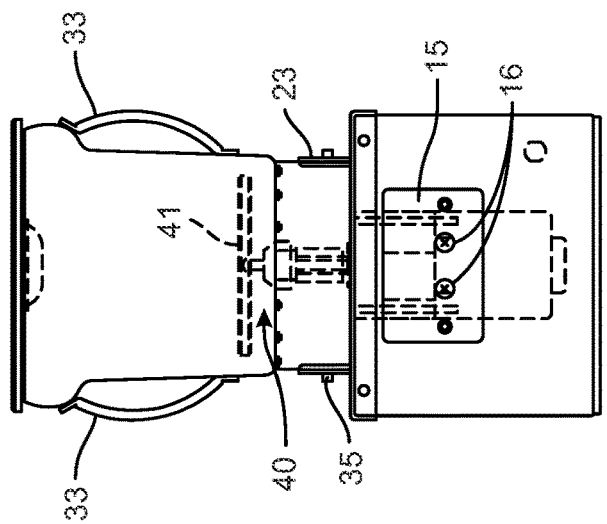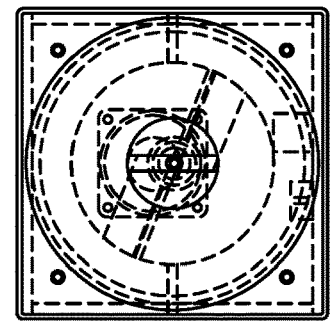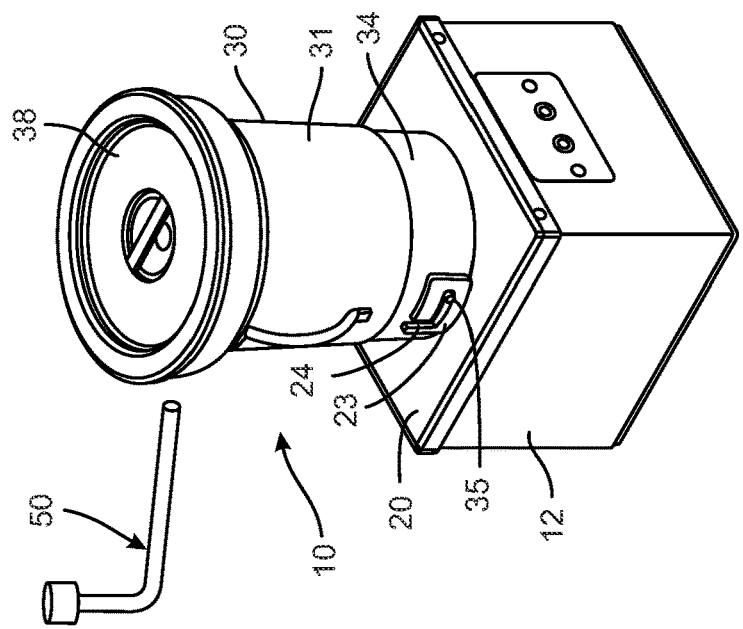

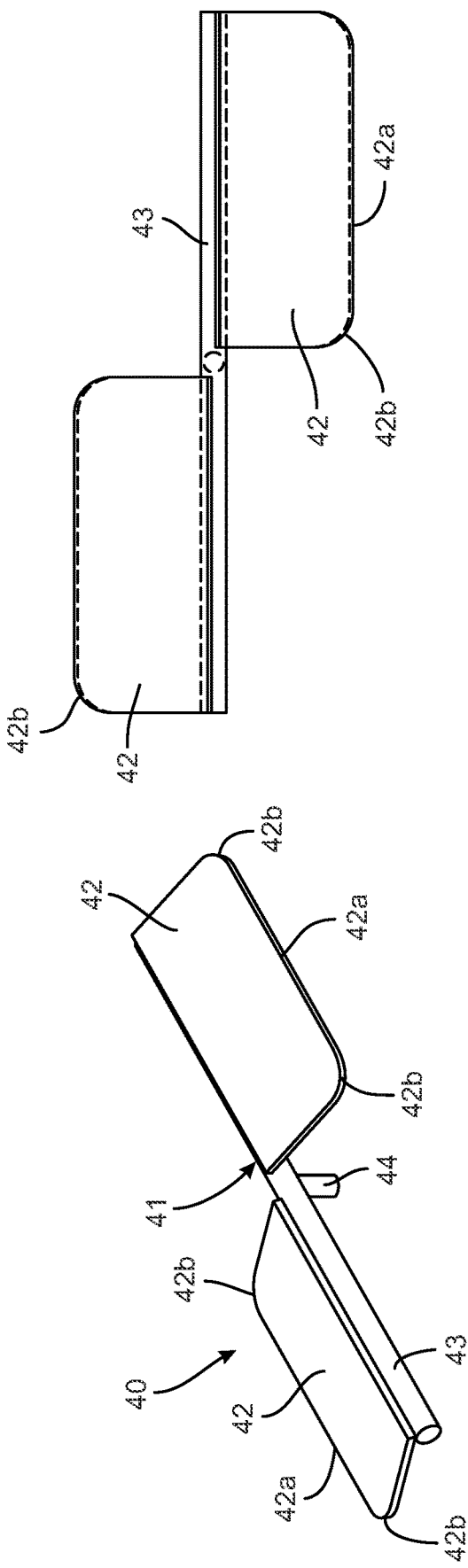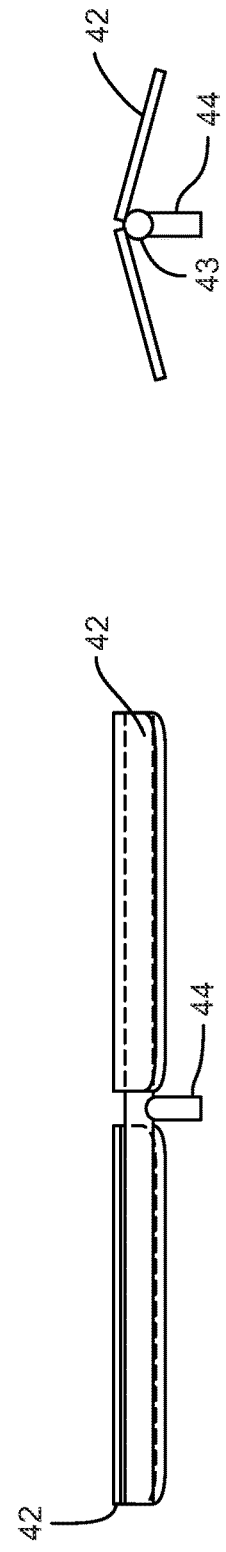

COMBINED STIRRING, MIXING AND BLENDING APPARATUS FOR COMMERCIAL KITCHENS

REFERENCE TO RELATED APPLICATION AND PRIORITY CLAIM

This application is a continuation of U.S. application Ser. No. 17/068,208, filed on Oct. 12, 2020, which issued as U.S. Pat. No. 11,793,357 on Oct. 24, 2023, and which is a utility filing from and claims priority to U.S. Provisional Application No. 62/915,891, filed on Oct. 16, 2019, the entire disclosure of which is incorporated herein by reference.

BACKGROUND

The present disclosure relates to devices and apparatus for use in commercial kitchens for the bulk preparation of food products. In many commercial kitchens, such as fast-food restaurants, liquid and dry ingredients are combined to create batters, sauces and oils used in the preparation of the food product. The food product typically includes some form of protein, such as fish, chicken and pork, or vegetable, such as onions, pickles and the like, that is coated with a batter, sauce or oil prior to cooking the protein.

The batter, sauce or oil is often prepared by manually mixing the ingredients in a mixing bowl. This approach is labor-intensive and time consuming, which can be detrimental in a high throughput fast-food restaurant. There is a need for an apparatus that can stir, mix and blend the ingredients for a wide range of batters, sauces and oils for use in the bulk preparation of food products.

SUMMARY OF THE DISCLOSURE

An apparatus is provided that combines stirring, mixing and blending functions that is particularly suited for commercial and high-volume food preparation. The apparatus that can perform these operations without injecting air into the product, which can disturb the flavor profile of the product. The apparatus includes a mixing container mountable on a base which houses the components and controllers for rotating a unique mixing blade assembly within the container. The mixing blade assembly includes a pair of substantially flat wings mounted on the opposite sides of a horizontal rod. The wings do not have any sharp edges, which improves the ability of the apparatus to mix dry particles with both hot and cold liquids. The wings are oriented at a downward angle relative to a horizontal rod which enhances the stirring, mixing and blending functions of the apparatus.

DESCRIPTION OF THE FIGURES

FIGS. 1A-1D are perspective, top, side and end views of a stirring, mixing and blending (SMB) apparatus according to the present disclosure.

FIGS. 5A-5D are perspective, top, side and end views of a blade assembly for the SMB apparatus shown in FIGS. 1A-1D and FIG. 2.

DETAILED DESCRIPTION

Figure 2:
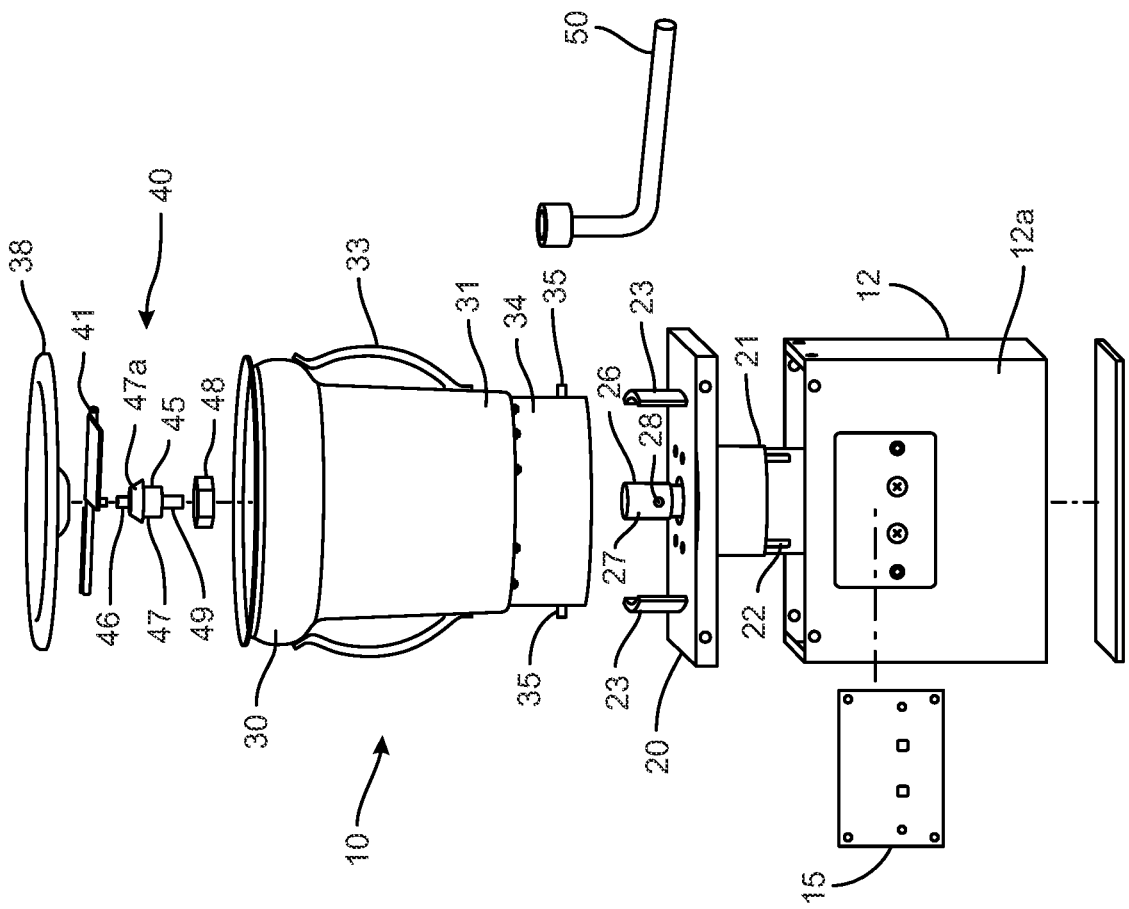
FIG. 2 is an exploded view of the SMB apparatus shown in FIGS. 1A-1D.
Figure 4A:
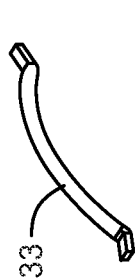
FIGS. 4A-4D are perspective, top, side and end views of a side handle for the container shown in FIGS. 3A-3D.
Figure 4B:
Figure 4C:
Figure 4D:
Figure 3B:
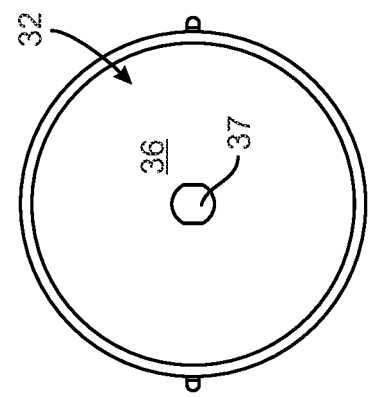
FIGS. 3A-D are perspective, top, side and end views of a mixing container of the SMB apparatus shown in FIGS. 1A-1D and FIG. 2.
Figure 3D:
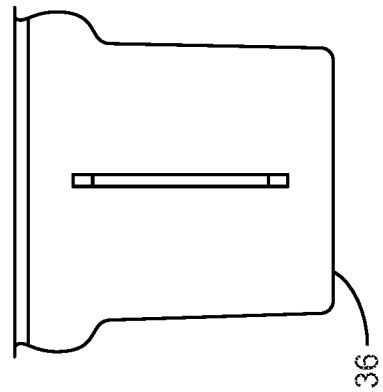
Figure 3A:
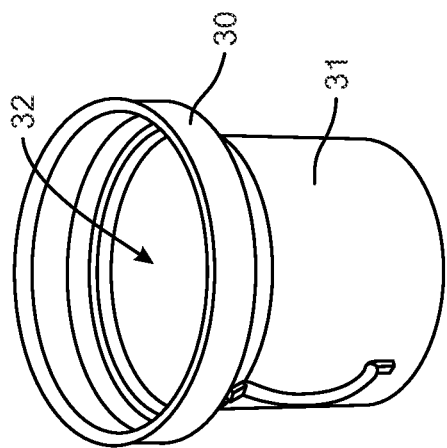
Figure 3C:
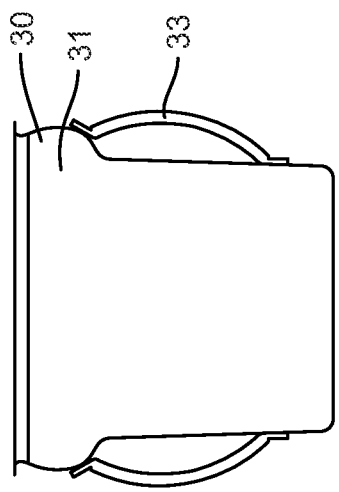

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

A stirring, mixing and blending (SMB) apparatus 10, shown in FIGS. 1A-D and 2, includes a base 12 and a container 30 supported on the base. The container includes a rotating mixing blade assembly 40 that performs the stirring, mixing and blending functions, as described herein. The base houses a drive assembly that includes a motor 14 for driving the mixing blade assembly, and control circuitry 15 configured to control the operation of the motor. The control circuitry 15 is disposed inside the base 12 and can be accessed by removing the mounting plate 20. The control circuitry can incorporate a printed circuit board or microprocessor for greater flexibility in controlling the operation and duration of operation of the motor. The motor is preferably an AC-powered motor connected to an AC power supply (not shown), although the motor can be a DC motor with a DC power supply integrated into the base 12.

In one feature of the disclosed apparatus, the mixing blade assembly is driven at a significantly lower rotational speed than conventional mixers and blenders. Conventional appliances typically operate at over 1000 rpm, and often up to 10,000 rpm. This speed is necessary for the conventional mixers and blenders to function properly, but operation at this high speed can introduce air into the product being mixed. In some cases, this aeration of the product can disrupt the flavor profile intended for the product. In accordance with one aspect of the present disclosure, the mixing blade assembly is driven at a much lower rotational speed, particularly less than 500 rpm, and more particularly at 360 rpm. The motor 14 can be configured to operate at that low rotational speed. Optimally, however, the drive assembly can include a gearbox 17 at the output of the motor to gear down the rotational speed of the motor output shaft. This allows use of a higher speed motor, which is capable of a wider speed range and is better able to generate the start-up torque sometimes needed to begin spinning the blade assembly in a viscous mixture of food components. In one embodiment, the motor is a 120V, 40 W, 60 Hz motor that operates at a nominal speed of 1800 rpm. The gearbox is configured for a gear ratio of 1:5.

Manual controls 16 (FIG. 1C) may be mounted on the base for activating the motor by way of the control circuitry. The manual controls can be in the form of push buttons, switches or dials or any other component that can be manually operated to activate and modify the motor control. The manual controls 16 can be used to activate the motor, adjust the length of operation, adjust the rotational speed of the blade assembly, or other functions. In one embodiment, the control circuitry can include separate dip switches that can be used to set the length of time the SMB apparatus operates upon activation. In one specific embodiment the control circuitry, or dip switches, can be configured to adjust the duration up to 345 seconds, which is sufficient for application in a commercial kitchen. Longer or shorter durations are also contemplated.

The base 12 is provided with a mounting plate 20 that closes the top of the housing 12a of the base and provides an interface to the container 30. The mounting plate 20 includes a downwardly projecting sleeve 21 that mates in telescoping fashion with a base sleeve 22. The motor gearbox 17 may be disposed within the base sleeve 22. Alternatively, the sleeve 21 can be engaged directly to the motor gearbox or motor so that the motor and its gearbox are supported by the mounting plate 20. An output shaft 28 (FIG. 1D) of the gearbox terminates in a drive hub 26 on the opposite side of the mounting plate 20. The mounting plate 20 may include a bearing or low-friction sleeve to reduce rotational friction of the gearbox output shaft extending through the mounting plate. The drive hub 26 can include a bore 27 for receiving a set screw to fasten the drive hub to the output shaft of the gearbox.

The container 30, shown in detail in FIGS. 3A-3D, includes a cylindrical body 31 that defines an interior volume 32 for receiving the ingredients to be mixed, such as liquid and dry ingredients used to prepare batters, sauces and oils. Different containers can be provided having different volumes as needed for the particular food product being prepared. In specific embodiments, the apparatus 10 is capable of operating with container volumes ranging from seven quarts to eight gallons. The mouth of the interior volume 32 can have a diameter of 245 mm in a specific embodiment. A pair of handles 33 (shown in detail in FIGS. 4A-4D) are mounted diametrically opposite each other on the body 31 to facilitate transport of the container when full of ingredients. A lid 38 (FIG. 1A) is provided to close the container during the stirring, mixing and blending process. The bottom wall 36 of the container defines an opening 37 to permit engagement between the blade assembly 40 disposed within the interior 32 of the container 30 and the drive motor and gearbox disposed in the base 12.

The blade assembly 40 is positioned within the interior 32 of the container. As shown in FIG. 2, the blade assembly includes a bearing mount 45 that connects the mixing blade sub-assembly 41 of the blade assembly to the gearbox output, by way of the drive hub 26. The bearing mount 45 thus includes a mounting stub 46 configured for engagement to the mixing blade sub-assembly 41, a bearing body 47 that is seated within the opening 37 in the bottom wall 36 of the container 30, and a nut 48 used to restrain the bearing mount 45 in the vertical direction. The bearing body 47 extends through the opening 37 and can include a lower threaded portion for engagement with the nut 48 at the bottom wall 36 of the container. The bearing body 47 and opening 37 are configured to maintain a fluid-tight seal at the opening 37. The conical head 47a of the bearing body 47 is compressed against the bottom wall by the nut 48 to effectively seal the opening 37. The opening can include a seal to enhance the fluid-tight seal.

A mounting shaft 49 extends from the mounting stub 46 and through the bearing body 47 and is configured for telescoping engagement with the drive hub. The mounting shaft 49 and the inner bore (not shown) of the drive hub 26 can be keyed so that the shaft 49 can slide vertically into the drive hub when properly oriented. The mounting shaft and inner bore can thus have a "D" cross-section so that the two components rotate together when they are connected. The mounting shaft 49 can be readily removed from the drive hub 26 when it is desired to lift the container 30 from the base 12.

The container 30 interfaces with the base 12 through a cylindrical sleeve 34. The cylindrical sleeve 34 encloses the engagement between the drive hub 26 and the bearing mount 45 of the blade assembly 40. The cylindrical sleeve 34 also includes knobs 35 projecting radially outward at diametrically opposite positions. The knobs 35 are configured to be received within bayonet slots 24 defined in two upstanding curved flanges 23 on the mounting plate 20. When it is desired to mount the container 30 on the base 12, the keyed features of the drive hub 26 and mounting shaft 49 are aligned. The tool 50 can be used to rotate the mounting shaft 49 to orient the keyed feature (such as the D cross-section) with the drive hub. The container 30 is then placed with the knobs 35 aligned with the open end of the bayonet slots 24 in the two flanges 23. The knobs are then dropped into the bayonet slot with the mounting shaft 49 sliding into the bore of the drive hub 26 at the same time. The container 30 is rotated so that the knobs 35 travel along the horizontal extent of the bayonet slot 24 to hold the container in position on the base 12. Removing the container simply requires rotating the container in the opposite direction to disengage the knobs 35 from the bayonet slot 24 and then lifting the container clear of the base.

In one important feature of the SMB apparatus disclosed herein is the design of the mixing blade sub-assembly 41. The mixing blade sub-assembly 41, and particularly the wings 42, is configured to combine stirring, mixing and blending functions in the same apparatus. The mixing blade is able to rotate at a low speed compared to other mixers in the commercial kitchen industry, and to do so without causing aeration or whipping of the ingredients being combined. As shown in FIGS. 5A-5D, the mixing blade sub-assembly 41 includes two wings 42 at diametrically opposite positions relative to a center mounting shaft 44. The mounting shaft 44 is configured to engage the mounting stub 46 of the bearing mount 45. The shaft 44 can be preferably threaded into engagement with the stub 46, with the threading direction counter to the direction of rotation of the blade assembly 40 within the container 30. The stub can include a threaded bore with the mounting shaft including external threads, or the stub can include the external threads with the threaded bore formed in the mounting shaft. As depicted in FIG. 1C, the diameter of the mixing blade is slightly less than the inner diameter of the container adjacent the bottom wall 36. In one specific embodiment, the inner diameter of the container is 165 mm while the wingspan of the mixing blade is 163 mm. It is thus contemplated that there is a 1 mm gap between each wing and the wall of the container 30.

The wings 42 are fixed to a transverse or diametrical rod 43, and the mounting shaft 44 is fixed to the transverse shaft, extending perpendicularly downward from the rod. The wings, rod and mounting shaft can be affixed by welding or gluing, or can be formed as one piece, such as via a 3D printing process. The mixing blade sub-assembly 41 is formed of a food grade material that can be cleaned and sterilized between uses. In one specific embodiment, the wings, rod and mounting shaft can be formed of stainless steel or aluminum.

The two wings project from opposite sides of the rod 43, as shown in FIG. 5B. Moreover, the wings are angled downwardly as shown in FIG. 5D, toward the bottom wall 36 of the container when the blade assembly is in position within the container. In one feature, the two wings are oriented at a non-perpendicular angle relative to the vertically oriented mounting shaft 44. In a specific embodiment it has been found that an angle of 75° (±2°) produces ideal results for stirring, mixing and blending multiple ingredients when operating at a relatively low rotational speed (such as 360 rpm). In another feature, the edges 42a of the wings 42 are blunt, and not sharp as in other mixing devices. Moreover, the corners 42b of the wing are rounded, at an 8 mm radius in a specific embodiment. The blunt edges and rounded corners are believed to help prevent cavitation or whipping of the ingredients during operation of the SMB apparatus. The blunt edges and rounded corners, along with the downward angle of wings, allow the mixing blade sub-assembly 41 to be rotated at the comparatively low speed (360 rpm) described above.

The present disclosure should be considered as illustrative and not restrictive in character. It is understood that only certain embodiments have been presented and that all changes, modifications and further applications that come within the spirit of the disclosure are desired to be protected.

What is claimed is:

1. A stirring, mixing and blending (SMB) apparatus comprising:
    a base housing a drive assembly, the drive assembly including a motor for generating rotational motion at an output shaft;
    a container for containing a food composition to be processed by the SMB apparatus, the container removably mounted to the base;
    a blade assembly rotatably mounted within said container and removably engageable to said output shaft for rotation by said motor, said blade assembly including;
    a transverse rod;
    a mounting shaft perpendicular to said transverse rod and configured to removably engage said output shaft and support said transverse rod for rotation within said container; and
    a pair of flat wings, each affixed to and projecting in opposite directions from and transverse to said transverse rod and each angled downward toward said mounting shaft at a fixed angle of 75° (±2°) relative to said mounting shaft,
    wherein said drive assembly is configured to drive said blade assembly at a rotational speed of no more than 500 rpm.

2. The SMB apparatus of claim 1, wherein each of said wings is substantially rectangular with a longer side extending along the transverse rod.

3. The SMB apparatus of claim 2, wherein each of said wings includes an edge that is not attached to said transverse rod, wherein said edge is blunt.

4. The SMB apparatus of claim 2, wherein said edge of each of said wings includes a pair of rounded corners.

5. The SMB apparatus of claim 1, wherein:
    said container defines an inner diameter at said blade assembly; and
    said pair of wings mounted to said transverse rod define an effective diameter that is 2 mm less than said inner diameter of said container.

6. The SMB apparatus of claim 5, wherein said inner diameter of said container is 165 mm and said effective diameter of the mixing blade is 163 mm.

7. The SMB apparatus of claim 1, wherein said drive assembly includes a gearbox between said motor and said output shaft.

8. The SMB apparatus of claim 7, wherein said motor is configured to operate at 1800 rpm and said gearbox has a drive ratio of 1:5 to drive said blade assembly at 360 rpm.

9. The SMB apparatus of claim 1, wherein said base includes a housing and a mounting plate mountable on said housing, said mounting plate carrying said drive assembly.

10. The SMB apparatus of claim 1, wherein said mounting shaft is removably engageable to said output shaft in telescoping engagement.

11. The SMB apparatus of claim 1, wherein said container includes a lid.

12. The SMB apparatus of claim 1, wherein said container includes a pair of handles for carrying the container.

* * * * *